Nov. 13, 1928. 1,691,805
T. HAULTON
TROLLEY HARP AND WHEEL ASSEMBLY
Filed Dec. 19, 1927
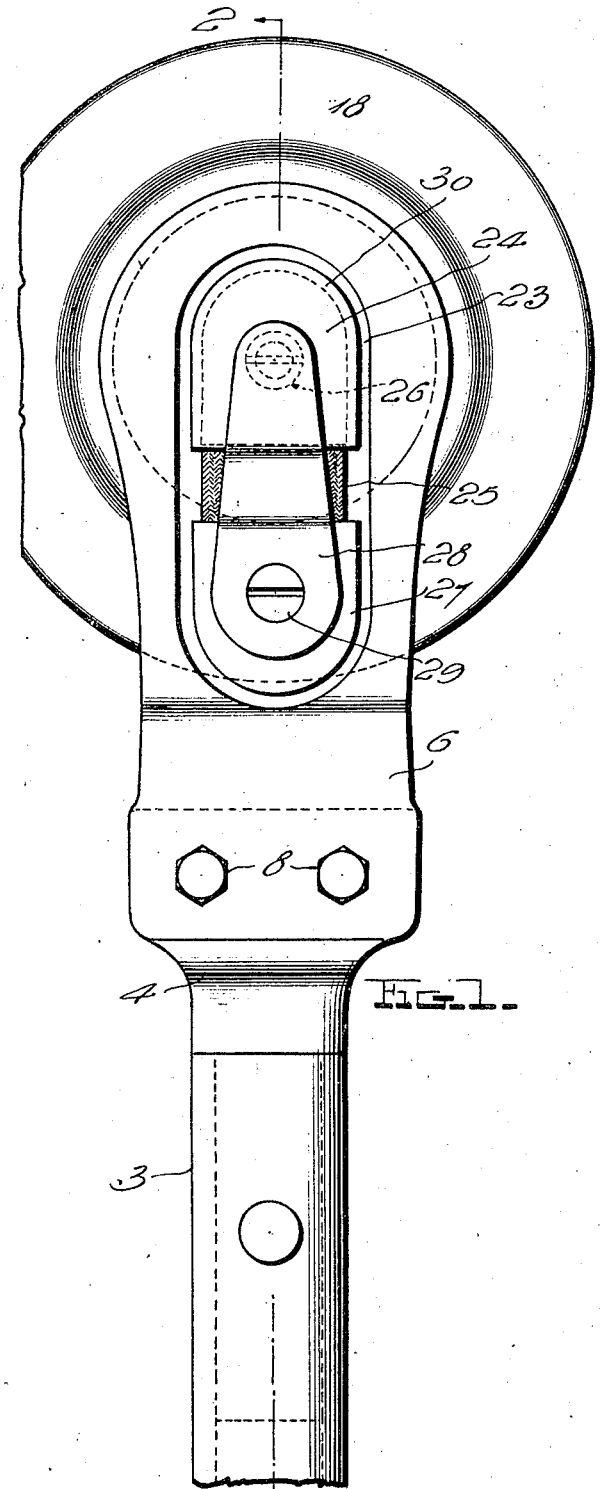
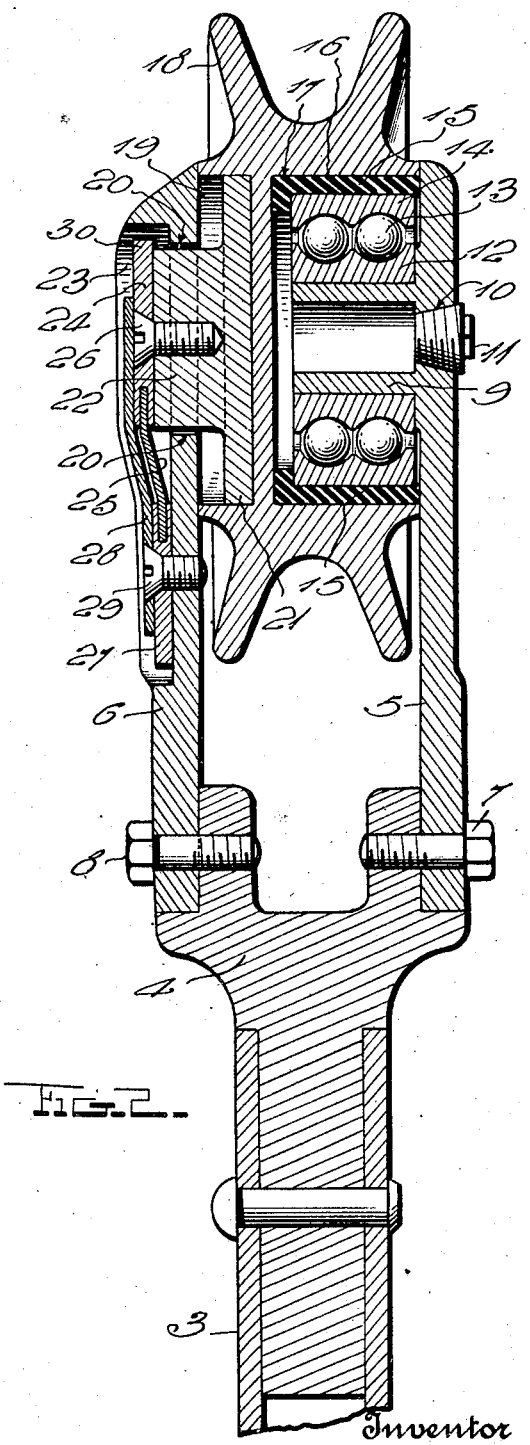
Witness
H. Woodard
Inventor
Thomas Haulton.
By H. R. Wilson & Co.
Attorneys Patented Nov. 13, 1928.

1,691,805

UNITED STATES PATENT OFFICE.

THOMAS HAULTON, OF JOHNSTOWN, PENNSYLVANIA, ASSIGNOR TO PENN MACHINE COMPANY, OF JOHNSTOWN, PENNSYLVANIA, A CORPORATION OF PENNSYLVANIA.

TROLLEY HARP AND WHEEL ASSEMBLY.

Application filed December 19, 1927. Serial No. 241,118.

The invention aims to provide a new and improved assembly of trolley wheel and harp, in which novel provision is made for normally holding the wheel in place, yet for permitting removal thereof when desired, and for collecting current from the wheel and conducting it to the trolley pole or other conductor.

With the foregoing in view, the invention resides in the novel subject matter hereinafter described and claimed, description being accomplished by reference to the accompanying drawing.

Fig. 1 is a side elevation.

Fig. 2 is a vertical section on line 2—2 of Fig. 1.

The drawing above briefly described, illustrates the preferred form of construction, and while this construction will be herein specifically explained, it is to be understood that within the scope of the invention as claimed, variations may be made.

3 denotes a trolley pole having a head 4 to which a fixed harp arm 5 and a removable harp arm 6, are secured by screws or the like 7—8 respectively. The fixed arm 5 is provided at its inner side with an integral stud 9 preferably of tubular form and communicating with an opening 10 which is normally closed by a screw plug 11, removal of the plug serving to permit the injection of grease through the tubular stud to lubricate the wheel bearing hereinafter described.

A race ring 12 is pressed tightly upon the stud 9, ball or roller bearings 13 contact with the outer side of this race ring, and a second race ring 14 surrounds said ball or roller bearings. Pressed upon the race ring 14, is an insulating ring 15 which tightly engages the peripheral wall 16 of a relatively large recess 17 in one end of the trolley wheel 18, all of the parts 9—12—13—14—15, being received in this recess, which receives lubricating grease from the tubular stud 9, so as to effectively lubricate the ball or roller bearings. Electric current is prevented from traveling through these bearings from the wheel by the insulating ring 15.

In the side of the wheel 18, opposite the recess 17, is a second recess 19 which is axially alined with said recess 17, the two recesses being of course of circular outline. Whereas the outer end of recess 17 is closed by the fixed arm 5, the outer end of recess 19 is closed by the removable arm 6, and the latter is provided with a non-circular opening 20 in communication with said recess 19. A collector plate 21 is disposed in the inner portion of the recess 19 and contacts with the inner side thereof, the outer side of said collector plate being provided with an integral, non-circular projection 22 which passes non-rotatably but slidably through the opening 20 and has its outer end received in an elongated recess 23 formed in the outer side of the arm 6. A terminal plate 24 on one end of a flexible conductor 25, contacts with the outer end of the projection 22 and is secured thereto by a screw 26, a similar terminal plate 27 on the other end of said conductor 25, being disposed within the lower portion of the recess 23, in contact with the inner side of the latter. A spring 28 lies against the outer sides of the terminal plates 24—27, and a screw 29 passes through the lower end of this spring and through the plate 27, into the arm 6, to secure said spring and plate 27 to said arm. This spring, like the parts 24—25—27, is disposed in and protected by the recess 23, and said spring acts to hold the collector plate 21 in contact with the trolley wheel 18, to receive current from the latter. Petroleum jelly or the like may be packed into the recess 19 to lubricate the contacting surfaces of the wheel and the plate 21.

The plate 24 is of greater size than the projection 22, so that its peripheral portion 30 projects beyond said projection to strike the inner face of the recess 23 and hold said projection against dropping from the opening 20, when the arm 6 is detached from the head 4. This detachment of arm 6 is effected when a worn trolley wheel is to be taken off and a new wheel substituted, and it will be observed that the parts 21—22—24—26—25—27—28—29, are bodily removable with said arm, giving unobstructed access to the wheel for removing it, and permitting substitution of a new wheel with equal ease.

Excellent results are obtainable from the general construction shown and described and it is therefore preferably followed. However, within the scope of the invention as claimed, numerous variations in form, proportion and minor details, may be made.

I claim:—

1. A trolley harp having a removable arm and a fixed arm, a trolley wheel between said arms having axially alined recesses whose outer sides are closed thereby, bearing means in one of said recesses mounting said wheel on said fixed arm, a spring-pressed collector plate in the other of said recesses provided with a non-circular projection on its outer side, said removable arm having a non-circular opening through which said projection passes slidably and non-rotatably, and a flexible conductor at the outer side of said removable arm secured at one end thereto and secured at its other end to the outer end of said projection.

2. A structure as specified in claim 1; together with means rigid with said projection to strike the outer side of said removable arm and prevent falling of said projection from the aforesaid opening upon removal of said removable arm.

3. A trolley harp having a removable arm and a fixed arm, a trolley wheel between said arms having axially alined recesses whose outer sides are closed thereby, bearing means in one of said recesses mounting said wheel on said fixed arm, a spring-pressed collector plate in the other of said recesses provided with a non-circular projection on its outer side, said removable arm having a non-circular opening through which said projection passes slidably and non-rotatably, and a flexible conductor at the outer side of said removable arm secured at one end thereto and secured at its other end to the outer end of said projection, said other end of said conductor having a portion projecting beyond said projection to prevent falling of the latter from said opening upon detachment of said removable arm.

4. A trolley harp having a removable arm and a fixed arm, a trolley wheel between said arms having axially alined recesses whose outer ends are closed thereby, bearing means in one of said recesses mounting said wheel on said fixed arm, a collector plate in the other recess provided with a non-circular projection on its outer side, said removable arm having a non-circular opening through which said projection passes slidably but non-rotatably, a flexible conductor at the outer side of said removable arm provided at its ends with terminal plates lying against the arm and projection respectively, a spring at the outer side of said conductor having one end in contact with the projection-engaging terminal plate, a screw passing through the other end of said spring and the other of said terminal plates and threaded into said removable arm to secure said spring and said other terminal plate to this arm, and means securing said projection-engaging terminal plate to said projection.

5. A structure as specified in claim 4; the outer side of said removable arm being provided with a recess in which said spring and said conductor are disposed.

In testimony whereof I have hereunto affixed my signature.

THOMAS HAULTON.